United States Patent Office 3,456,999
Patented July 22, 1969

3,456,999
PERISCOPE
Gerhard Hopp, 33 Sonnenstrasse,
8 Munich 15, Germany
Filed Oct. 24, 1966, Ser. No. 589,030
Claims priority, application Germany, Oct. 29, 1965,
H 57,551
Int. Cl. G02b 23/08
U.S. Cl. 350—45                                6 Claims

ABSTRACT OF THE DISCLOSURE

A periscope for viewing a field from within a closed structure and including a triply bent optical axis including a first reflective surface, a first collecting lens, a guiding and reflective body, a second collecting lens with the first and second collecting lenses being spaced apart a distance equal to the sum of their focal lengths. The first reflective surface is inclined with respect to a horizontal plane to bend the optical axis in the range of $90° \pm 20°$. The guiding and reflective body has second and third reflective surfaces with the second surface being arranged at an obtuse angle with respect to the first, and the third surface at an acute angle with respect to the second surface. The first reflective surface is arranged in the objective opening and the first collecting lens is arranged in the central region of the optical axis.

---

The present invention relates to a periscope for viewing an object field from a concealed position, said telescope having two collecting systems arranged at a distance apart equal to the sums of the focal lengths and a guiding and reflecting body consisting of glass or plastic which substantially fills out the space between the collecting systems.

A periscope of this general type is known and consists of a lens arranged in the objective opening, a glass or plastic body shaped substantially in the form of a rhombus and another collecting system arranged in the vincinity of the eyepiece opening of the periscope, and a concave mirror or a lens. This known periscope has the disadvantage that it is very vulnerable to fragments since the first collecting system is arranged in the objective opening. The periscope body of the known periscope is constructed in two parts with a slit, which acts as field lens, being arranged in the center of the system (disclosed in U.S. Patent 2,992,593 to W. L. Hyde). This manner of division of the periscope body has the disadvantage that bending or deflection of the optical axis takes place on a reflective surface which belongs to two separate bodies. The aligning of these two bodies in such a manner that they form a single reflective surface is, however, difficult and very expensive to effect. In military practice it is necessary that damaged parts—and the upper periscope body is particularly subject to such damage for the reasons set forth—can be easily replaced. However, this is possible only with special equipment and skills in view of the required precise alignment of the periscope bodies.

One object of the present invention is to reduce the vulnerability of the periscope to fragments.

Another object of the invention is to reduce the cost of the manufacture and assembling of the periscope.

Another object of the invention is to simplify the replacement of damaged parts of the periscope.

Still another object of the invention is to create a periscope which is suitable for both land and marine vehicles as well as fixed fortifications.

The means for accomplishing the foregoing objects and other advantages, which will be apparent to those skilled in the art, are set forth in the following specification and claims, and are illustrated in the accompanying drawings dealing with basic embodiments of the present invention. Reference is made now to the drawings in which:

Figure 1:
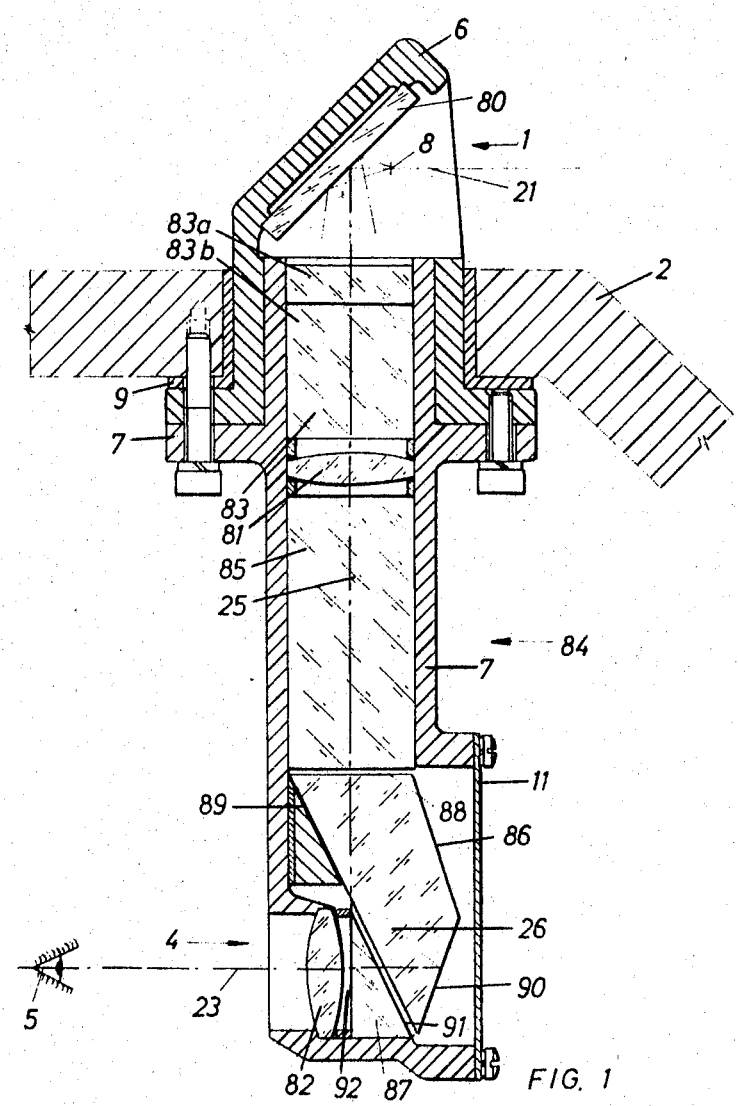
FIG. 1 shows a vertical section of a first embodiment of the inventive periscope.

FIG. 1 shows a vertical section through a portion of a protective shielding, such as in a vehicle or fortress, and an embodiment of the inventive periscope which has been mounted therein in an opening. A wall 2 forms a protective covering about an area for an eyepiece opening 4. The eye of the observer would be positioned at the exit pupil 5. The periscope is held in position by two housings 6 and 7. The first housing 6 is detachably seated on a collar of the second housing. The housings 6 and 7 are inserted in an opening of the wall 2, sealed with a packing 9 and screwed to the wall 2. Water is prevented from penetrating into the protected space by the packing 9. The objective opening 1 is rectangular in vertical section and substantially wider than it is high, and contains the entrance pupil 8. The cross-sectional size of the periscope is selected in agreement with the shape of the objective opening 1.

The periscope contains, as first reflective surface, a flat metal mirror 80 which is shaped according to the objective opening 1 and is accordingly of rectangular shape. The metal mirror 80 is fixedly mounted in the housing 6 at an angle of 45° to the horizontal and to the optical axis 21. Such a metal mirror 80 is relatively insensitive to damage, for instance by fragments; one or more holes in the metal mirror will merely result in a certain weakening of the intensity of the light of the field seen from the periscope. The periscope will not, however, become "blind." Such metal mirrors arranged in the objective opening can be easily replaced, together with the housing 6. Further, electrical heating means (not shown) may be provided so that droplets of water on the mirror will be evaporated.

The collecting system of the periscope contains two cylindrical lenses 81 and 82 which are arranged at a distance apart equal to the sum of their focal lengths. The curvatures of the lenses lie in a plane established by the optical axes 21, 25, 26, 23. Since the collecting system is arranged in the objective opening, it is not exposed to damage. Between the cylindrical lens 81 and the first deflecting mirror 80, there is arranged a spacer body 83 of plastic or glass consisting of two parts 83a and 83b. The spacer body provides a distance between the cylindrical lens 81 and the mirror 80 so that the exit pupil 8 lies in the vicinity of the mirror 80. With this arrangement, the mirror 80 can be made relatively small so that the objective opening 1 will be also relatively small. The resulting weakening of the intensity of coverage from the objective opening will be very small. The probability that the mirror will be struck is furthermore reduced and the camouflaging of the vessel or structure which contains the periscope is improved. Another advantage of the provision of the spacer body 83 is that the first collecting system 81 is additionally protected against fragments which might rebound from the metal mirror 80. The part 83a itself can be easily replaced without the other parts of the periscope having to be realigned with respect to each other.

Between the lenses 81 and 82 there is provided a guiding and reflecting body 84 which consists of a prism-shaped part 85 having end walls arranged substantially parallel and perpendicular to the optical axis 25. The prism-shaped part 85 has merely the function of guiding the light rays and can, therefore, be of relatively simple construction. This is advantageous in view of the fact that the prism-shaped part 85 is to be arranged in the central section of the periscope which is normally least accessible. The image inverting portion is located in the vicinity of the eyepiece opening and is therefore readily accessible from the closed space after removing a cover 11. The image inverting portion consists of a polygonal reversing prism 86 and of a wedge part 87. The reversing prism 86 contains a beam entering surface 88 which is arranged substantially perpendicular to the local optical axis 25, a second reflecting surface 89 which is at an angle of 25° to the local optical axis 25 and at an obtuse angle to the first reflecting surface (metal mirror 80) as well as a third reflecting surface 90 which is inclined at an angle of 70° with respect to the local optical axis 26 and is at an acute angle to the reflecting surface 89 so that the last portion 23 of the optical axis lies parallel to the first portion 21 of the optical axis.

The beam entering surface 91 of the wedge part 87 is parallel to the reflecting surface 89. The beam emergence surface 92 of the wedge part 87 is substantially perpendicular to the local optical axis 23. The guiding and reflecting body 84, therefore, contains two surfaces 89 and 90 which reflect the optical axis and are arranged in a single body, namely, the reversing part 86.

Dividing the guiding and reflecting body into at least two parts, furthermore, facilitates the replacement of such parts and the reinstallation of them. In this connection, the two parts need not be aligned precisely with respect to each other since the reflective surfaces for bending the optical axis are in a single unit.

The distance from the section 21 to the section 23 of the optical axis is a measure of the "physical" length of the system. From FIG. 1, it can be immediately seen that the length of the optical system, established by the sections 25 and 26 of the optical axis, does not greatly exceed the physical length of the system. This is desirable with respect to the obtainable, i.e., additional, viewing angle. In this connection the reflective surface 89 is relatively short and amounts to 190 mm. with a "physical" length of the system of 500 mm. The cost of manufacture of the prism is, therefore, not excessively high.

As a modification of the periscope of FIG. 1, it is possible to make the reflecting mirror of a glass or plastic block adapted to the objective opening, the rear of the block being developed as a reflective surface. In such case the metal mirror 80 can be dispensed with.

The angles described in the above embodiment are to be considered merely as illustrative. Thus, the angle between the local optical axis 25 and the reflective surface 89 may be less than 25° if a larger reflective surface 89 is tolerated. In order to reduce the size of the reflective surface 89, it is possible to select a somewhat larger angle to the local optical axis 25. In this case, however, an impairment of the ratio of the "physical" length of the system to the optical length of the system (established by the sections 25 and 26) will have to be tolerated.

Figure 2:
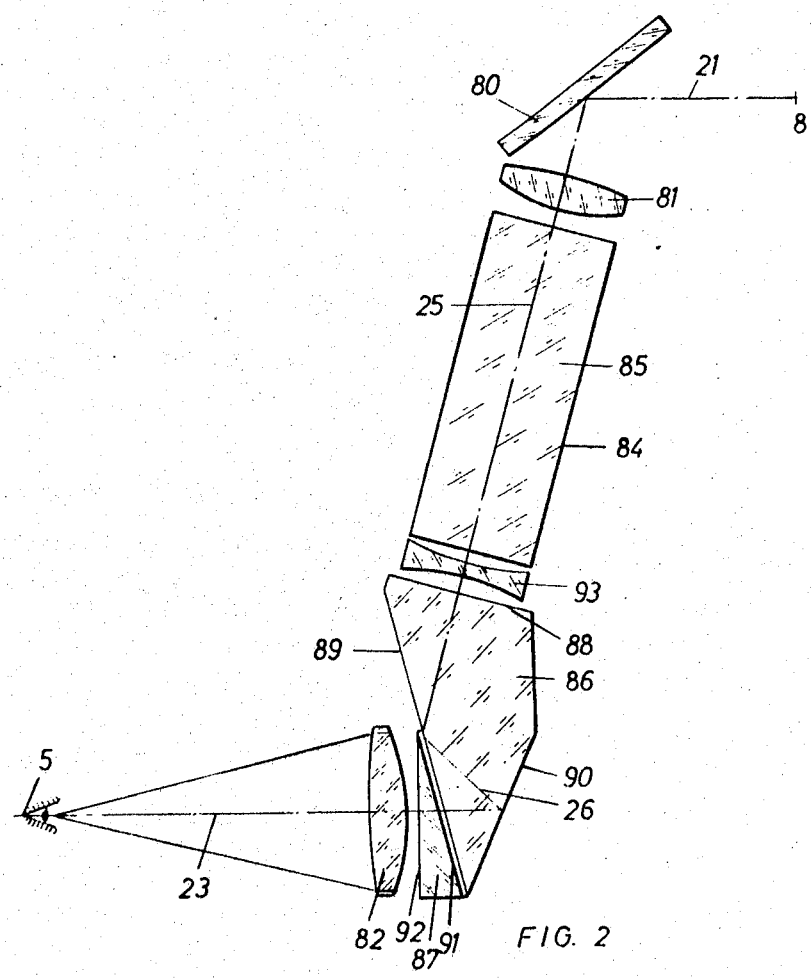
FIG. 2 shows schematic representation of the optical portions of a further embodiment of the invention.

In order to reduce the size of the reflective surface 89, it is possible to incline the local optical axis 25 to the perpendicular, as is done for instance in the embodiment shown in FIG. 2. Such an inclining of the local optical axis may be desirable in view of other circumstances of the vehicle or structure in which the periscope is installed, for instance, for entry or exit.

The reference numbers in the embodiment shown in FIG. 2 agree with those of the embodiment of FIG. 1 and what has been already stated applies correspondingly to these parts. The mirror 80 is now inclined at 37.5° to the horizontal and to the optical axis 21 such that the local optical axis 25 is inclined 15° to the vertical. The reflecting surface 89 is inclined 30° with respect to the local optical axis 25, and the reflective surface 90 is inclined 67.5° with respect to the local optical axis 26. If the same "physical" system length of the periscope of 500 mm. is taken as basis, then the reflective surface 89 will be 160 mm. long.

Figure 3:
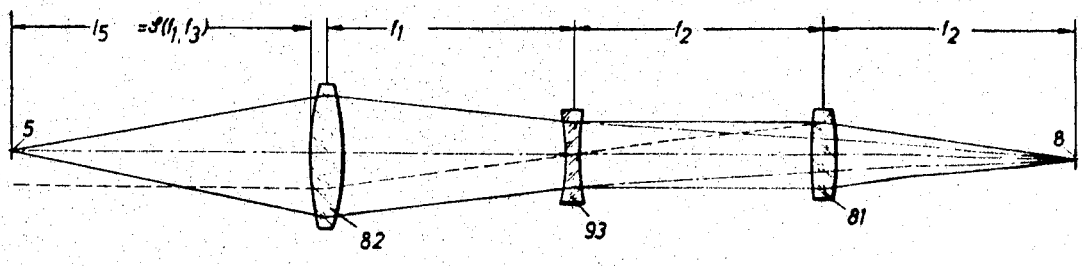
FIG. 3 shows a schematic view along the optical axis of FIG. 2.

As a further modification of the embodiment shown in FIG. 1, the spacer body 83 has been omitted in the embodiment shown in FIG. 2 and a cylindrical diverging lens 93 has been arranged at the common focal line of the cylindrical lenses 81 and 82. This can best be noted from FIG. 3. In the embodiment shown in FIG. 2, a common focal line of the cylindrical lenses 81 and 82 is located in the slit between the prisms 85 and 86. The focal length of the diverging lens 93 is so selected that the focal line of the total system, consisting of the lenses 82 and 93, lies at the desired line of the exit pupil 5. If the focal length of the lens 82 is designated $f_1$, that of the lens 81 as $f_2$ and that of the lens 93 as $f_3$, then with a distance $l_5$ of 1.5 $f_1$ between the exit pupile 5 and the lens 82, a focal length $f_3 = -2f_1$ of the diverging lens 93 is necessary. With a pupil spacing $l_5$ of 2 $f_1$, a focal length of $f_3 = -f_1$ is required. Such a lengthening of the distance $l_5$ between the exit pupil and the last lens surface is advisable since the focal lengths $f_1$ and $f_2$ must be kept small in order to increase the field of view while the distance $l_5$ of the exit pupil in front of the lens 82 must frequently be large when the observer must observe not only outside the vehicle or structure but also instruments within the closed space. If this requirement exists, the pupil spacing $l_5$ from the last lens surface should be at least 150 mm.

When a true-size reproduction of the object field is desired—and this is generally the case—the focal length of the lenses 81 and 82 are made the same.

In the case of longer periscopes, it may be advisable with respect to the angle of view to use three collecting systems which are placed one behind the other spaced at a distance equal to their focal lengths. Then, a reflecting of the optical axis in the central part of the periscope is not required. Furthermore, field lenses can be inserted in the two inner image planes in order to bend the beam.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description, and all changes which come within the meaning and range of equivalency of the claims are therefore to be embraced therein.

What is claimed is:

1. An optical system for a periscope for viewing a field from within an enclosure, said periscope comprising a triply bent optical axis the objective and eye-piece side ends of which are parallel to each other, said periscope, commencing with the objective side and proceeding along said triply bent optical axis to the eyepiece side, comprising a first metallic mirror surface, a spacing and light guiding body, a first collecting lens, a prismatic guide body, an elongated deflection and image inverting body, an optical wedge associated with the deflection body, and a second collecting lens, the first and second collecting lenses being spaced apart a distance equal to the sum of their focal lengths, the first mirror surface being so arranged that the central part of the optical axis coincides with the longitudinal axis of the prismatic guide body, the elongated deflection body having second and third mirror surfaces which are at an acute angle to each other and at an acute angle with respect to the longitudinal axis of said guide body, the first mirror surface being arranged at the objective side end and the first collecting lens being arranged in the central portion of the optical axis.

2. An optical system according to claim 1 in which said first mirror surface is inclined at an angle of approximately 45°, the second mirror surface at approximately 25° and the third mirror surface at approximately 70° all with respect to the optical axis.

3. An optical system according to claim 1 in which a dispersing lens is arranged in a gap between the guide body and the inverting body.

4. A periscope according to claim 1 in which the optical axis is inclined by about 37.5 with respect to the first mirror surface, by about 30° with respect to the second mirror surface and by about 67.5° with respect to the third mirror surface.

5. A periscope according to claim 1 in which the focal length of the diverging lens is so adapted to the focal length of the second collecting lens that the exit pupil for the observer is at least 150 mm. from the second collecting lens.

6. A periscope according to claim 5 in which the focal lengths of the first and second collecting lenses are the same.

References Cited

UNITED STATES PATENTS

| | | | |
|---|---|---|---|
| 829,121 | 8/1906 | Neumayer et al. | 350—45 |
| 1,505,878 | 8/1924 | Erfle | 350—45 |
| 2,423,267 | 7/1947 | Strang | 350—45 |
| 2,453,336 | 11/1948 | Orser | 350—49 |
| 2,570,357 | 10/1951 | Martin | 350—45 |
| 2,992,593 | 7/1961 | Hyde | 350—45 |
| 3,176,303 | 3/1965 | Holland | 350—292 |
| 3,204,523 | 9/1965 | Daily | 350—67 |
| 3,312,535 | 4/1967 | Anderson et al. | 350—288 |

FOREIGN PATENTS 83,919  8/1920  Austria.

DAVID SCHONBERG, Primary Examiner

PAUL GILLIAM, Assistant Examiner

U.S. Cl. X.R.

350—49, 52